(12) United States Patent
Hong et al.

(10) Patent No.: US 8,331,658 B2
(45) Date of Patent: Dec. 11, 2012

(54) TEXTURE REPRODUCTION SYSTEM AND METHOD AND CHROMA CORRECTION SYSTEM AND METHOD FOR PRESENCE ENHANCEMENT

(75) Inventors: Ji Young Hong, Gyeonggi-do (KR); Ho Young Lee, Gyeonggi-do (KR); Du-Sik Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1046 days.

(21) Appl. No.: 12/058,919

(22) Filed: Mar. 31, 2008

(65) Prior Publication Data
US 2009/0141977 A1 Jun. 4, 2009

(30) Foreign Application Priority Data
Nov. 29, 2007 (KR) ........................ 10-2007-0122910

(51) Int. Cl.
*G06K 9/00* (2006.01)
(52) U.S. Cl. ...................................................... 382/162
(58) Field of Classification Search .......... 382/162–163, 382/165, 167, 176, 254, 260–265, 272, 274–275; 358/1.9, 2.1, 516–520; 348/223.1, 253–256, 348/645, 649, 655
See application file for complete search history.

(56) References Cited

U.S. PATENT DOCUMENTS

| 6,804,408 | B1 | 10/2004 | Gallagher et al. |
| 7,663,788 | B2 * | 2/2010 | Kameyama .................... 358/518 |
| 7,889,280 | B2 * | 2/2011 | Osawa ........................... 348/650 |
| 2001/0009438 | A1 | 7/2001 | Kihara et al. |
| 2003/0063145 | A1 | 4/2003 | Fujita et al. |
| 2003/0108250 | A1 | 6/2003 | Luo et al. |

OTHER PUBLICATIONS

Braun G. J. et al, "Image lightness rescaling using sigmoidal contrast enhancement functions", Journal of Electronic Imaging, SPIE/IS&T, vol. 8, No. 4, Oct. 1, 1999, pp. 380-393.

* cited by examiner

*Primary Examiner* — Jose Couso
(74) *Attorney, Agent, or Firm* — Staas & Halsey LLP

(57) ABSTRACT

A texture reproduction system and method and a chroma correction system and method for presence enhancement are provided. The texture reproduction system including: a texture analysis unit to classify a pixel included in an input image using Red Green Blue (RGB) values of the pixel; a chroma correction unit to correct a chroma based on at least one of an average chroma value of the input image and a hue value of the pixel according to a classification of the pixel; and a spatial filter unit to output a final output value of the pixel via a high frequency component extracted using the RGB values for each pixel.

25 Claims, 9 Drawing Sheets

TEXTURE REPRODUCTION SYSTEM AND METHOD AND CHROMA CORRECTION SYSTEM AND METHOD FOR PRESENCE ENHANCEMENT

CROSS-REFERENCE TO RELATED APPLICATION

This application claims the benefit of Korean Patent Application No. 2007-122910, filed on Nov. 29, 2007 in the Korean Intellectual Property Office, the disclosure of which is incorporated herein by reference.

BACKGROUND OF THE INVENTION

1. Field of the Invention

Aspects of the present invention relate to a texture reproduction system and method, and a chroma correction system and method for presence enhancement.

2. Description of the Related Art

Presence is a higher order concept including both realism and immersion, and comprehensively deals with the immersion generated by a human visual perceptual attribute and the realism generated on a premise of a sensibility of a remembered object.

A conventional texture enhancement method enhances at least one of detail and an edge using a simple digital filter based on only a geometric attribute. Accordingly, an image processing is performed being inappropriate for a feature of each texture provided by image contents, and is known as an image enhancement scheme unrelated to the presence. Since the conventional texture enhancement method enhances the texture by enhancing only the at least one of the detail and the edge using the digital filter of signal Y, the conventional texture enhancement method increases the realism.

SUMMARY OF THE INVENTION

Aspects of the present invention provide a texture reproduction system and method which can maximize realism using an image processing that adaptively reflects a feature based on a feature of a texture by analyzing an input image and controlling both a geometric attribute and a color attribute, which configure a tactile sensation of a visual aspect, based on the feature of the texture corresponding to the input image.

Aspects of the present invention also provides a chroma correction system and method which can control a chroma using a hue value when a pixel is determined as a soft pixel according to a classification of the pixel, and control the chroma using an average chroma of an entire input image and a Local Maximum Difference (LMD) of each pixel when the pixel is determined as a rough pixel.

According to an aspect of the present invention, there is provided a texture reproduction system including: a texture analysis unit to classify a pixel included in an input image using Red Green Blue (RGB) values of the pixel; a chroma correction unit to correct a chroma based on at least one of an average chroma value of the input image and a hue value of the pixel according to a classification of the pixel; and a spatial filter unit to output a final output value of the pixel via a high frequency component extracted using the RGB values for each pixel.

In an aspect of the present invention, the texture analysis unit includes: a feature value calculation unit to calculate a feature value of the pixel based on the RGB values; an LMD calculation unit to calculate an LMD of the feature value for each a*a-sized pixel group; and a texture determination unit to determine a texture of the pixel based on an average LMD of a b*b-sized pixel group and a predetermined LMD threshold. In this instance, the texture determination unit compares the average LMD and the LMD threshold and classifies the pixel as either a rough pixel or a soft pixel.

In an aspect of the present invention, the chroma correction unit includes: a chroma enhancement unit to enhance a chroma of the soft pixel based on a hue of the soft pixel and a predetermined target point; and a correction unit to correct a chroma value of the rough pixel based on the chroma value of the rough pixel, the average chroma value of the input image, and a gain.

According to another aspect of the present invention, there is provided a texture reproduction method including: classifying a pixel included in an input image using RGB values of the pixel; correcting a chroma based on at least one of an average chroma value of the input image and a hue value of the pixel according to a classification of the pixel; and outputting a final output value of the pixel via a high frequency component extracted using the RGB values for each pixel.

According to still another aspect of the present invention, there is provided a chroma correction system including: a chroma enhancement unit to enhance a chroma of a soft pixel based on a hue of a pixel and a predetermined target point according to a classification of the pixel; and a correction unit to correct a chroma value based on the chroma value, an average chroma value of an input image, and a gain according to the classification of the pixel.

According to yet another aspect of the present invention, there is provided a chroma correction method including: enhancing a chroma of a soft pixel based on a hue of a pixel and a predetermined target point according to a classification of the pixel; and correcting a chroma value based on the chroma value, an average chroma value of an input image, and a gain according to the classification of the pixel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
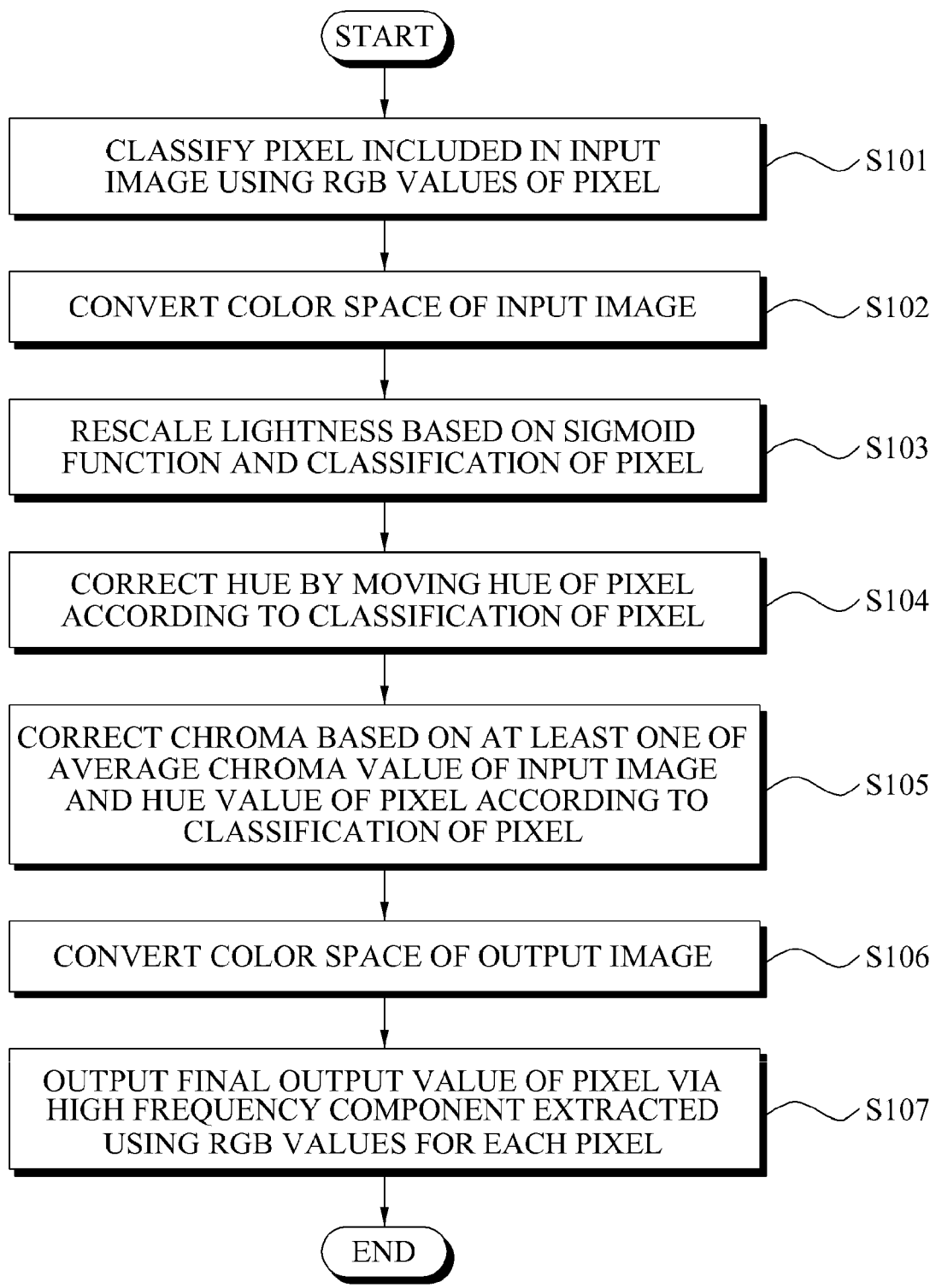
FIG. 1 is a flowchart illustrating a texture reproduction method for presence enhancement according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 is a flowchart illustrating a texture reproduction method for presence enhancement according to an embodiment of the present invention.

In operation S101, the texture reproduction system classifies a pixel included in an input image using Red Green Blue (RGB) values of the pixel. The texture reproduction system may calculate a predetermined feature value using the RGB values being input values for classifying a texture type of the pixel included in the input image. For example, the feature value may be calculated in accordance with Equation 1:

$$Y = R_{input} \times \alpha + G_{input} \times \beta + B_{input} \times \gamma, \quad \text{[Equation 1]}$$

where 'Y' (luminance) denotes a feature value, '$R_{input}$', '$G_{input}$', and '$B_{input}$' denote RGB values, and '$\alpha$', '$\beta$', and '$\gamma$' denote predetermined constants of which a sum is 1.

In this instance, the texture reproduction system may classify a texture of the pixel using the feature value changed from the RGB values. The present embodiment of the present invention classifies the pixel as one of two types of pixels, that is, either a rough pixel or a soft pixel and uses the pixel. For this, the texture reproduction system may use a Local Max Difference (LMD) being a maximum difference value between a center pixel value and an adjacent pixel value in an a*a-sized pixel group, and an average LMD of a b*b-sized pixel group, and a predetermined LMD threshold. For example, when 'n' is 3, the LMD may be calculated in accordance with Equation 2:

$$LMD = \text{MAX}(|P0 - P1|, |P0 - P2|, |P0 - P3|, \quad \text{[Equation 2]}$$
$$|P0 - P4|, |P0 - P5|, |P0 - P6|, |P0 - P7|, |P0 - P8|),$$

where 'P0' denotes a center pixel value, 'P1' to 'P8' respectively denote an adjacent pixel value, and an LMD may be calculated as an LMD value of a pixel corresponding to 'P0'. As described above, the texture reproduction system may calculate the LMD for each pixel included in the input image using the same method.

Figure 2:
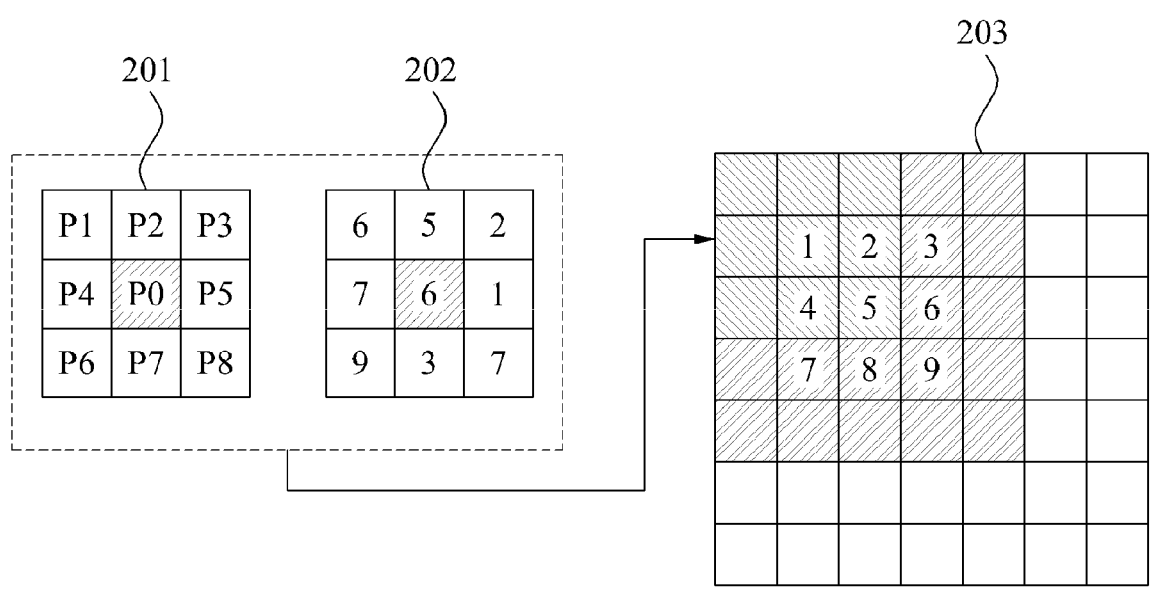
FIG. 2 illustrates an example for describing a method of calculating an average Local Max Difference (LMD) according to an embodiment of the present invention.

FIG. 2 illustrates an example for describing a method of calculating an average LMD according to an embodiment of the present invention. As described above, the texture reproduction system may calculate an LMD for a center pixel, the LMD being a maximum difference value between a center pixel value and an adjacent pixel value in a 3*3-sized pixel group 201 as a 3*3 mask, and calculate the LMD for each of all pixels included in the input image repeating the same method. For example, in a 3*3-sized pixel group 202, the LMD has a value of 5. In this instance, the texture reproduction system may calculate, as the average LMD, an average value of LMDs of pixels existing in a 5*5-sized pixel group 203. For example, the average LMD may be calculated in accordance with Equation 3:

$$LMD_{avg} = \frac{1}{N} \sum_{i=0}^{N-1} LMD_i, \quad \text{[Equation 3]}$$

where '$LMD_{avg}$' denotes an average LMD, and 'N' denotes a number of a* a-sized pixel groups included in a b*b-sized pixel group for calculating the average LMD.

As described above, when the average LMD is calculated, the texture reproduction system may compare the LMD threshold and the average LMD and classify the corresponding pixel as either a rough pixel or a soft pixel. Specifically, when the average LMD of the pixel is greater than or equal to the LMD threshold, the texture reproduction system may classify the pixel as the rough pixel, and when the average LMD is less than the LMD threshold, the texture reproduction system may classify the pixel as the soft pixel.

In operation S102, the texture reproduction system converts a color space of the input image. Since the color space of the input image is an RGB digital signal and is unassociated with a human visual system, a human perceptual attribute such as a lightness, a chroma, and a hue expressed as a final output of the human visual system may be used.

Many color spaces for converting the RGB digital signal into the three human perceptual attributes exist. For example, 'CIECAM02' is mainly used for accurate color display estimation, and 'Lightness, Chroma, Hue (LCH)' based on 'CIELAB' is mainly used for evaluating a difference of at least one of a color design and an image. Also, 'HSV' is mainly used for a color design and simple industrial applications. All color spaces for converting the RGB digital signal into the three human perceptual attributes may be applied to the present exemplary embodiment of the present invention. In this instance, as illustrated in table 1, different names and different abbreviations of the three human perceptual attributes may be applied to each color space.

TABLE 1

| Color space | Lightness | Chroma | Hue |
|---|---|---|---|
| CIECAM02 | Lightness(J) | Chroma(C) | Hue(H) |
| LCH | Lightness(L) | Chroma(C) | Hue(H) |
| HSV | Brightness or Value (B or V) | Saturation(S) | Hue(H) |

The present embodiment of the present invention converts the pixel value of the input image into the lightness, the chroma, and the hue of 'CIECAM02' being most similar to a human visual perception for a color space conversion of the input image.

In operation S103, the texture reproduction system rescales a lightness based on a sigmoid function and the classification of the pixel. In this instance, the texture reproduction system may apply the sigmoid function to a lightness value of an entire pixel based on lightness values and an average value of the lightness values, and apply different gains to a lightness value of the soft pixel from among pixels to which the sigmoid function is applied, based on the average value.

For this, the texture reproduction system may rescale the lightness by calculating an average value of the entire input image for the lightness value, and applying the sigmoid function to the entire input image using the average value. Here, a Look-Up Table (LUT) for scaling the lightness may be calculated using a discrete cumulative normal function in accordance with Equation 4:

$$S_i = \sum_{n=0}^{n=m} \frac{1}{\sqrt{2\pi}\,\sigma} e^{-((100x_n/m - x_0)^2/2\sigma^2)} \quad \text{[Equation 4]}$$

$$S_{LUT} = \frac{S_i - \min(S)}{\max(S) - \min(S)} \times (J_{maxout} - J_{minout}) + J_{minout},$$

where 'm' denotes a maximum lightness value, '$x_0$' and '$\sigma$' respectively denote an average of a normal function and a standard deviation, and '$J_{maxout}$' and '$J_{minout}$' respectively denote a maximum lightness value and a minimum lightness value. In this instance, the average value of the lightness values may be used as an average of the normal function, and the standard deviation may be used as a value of a predetermined range. For example, the range may include a range of 10 to 50, and as a value of the standard deviation increases, a degree of change in the rescale of the lightness decreases.

Figure 3:
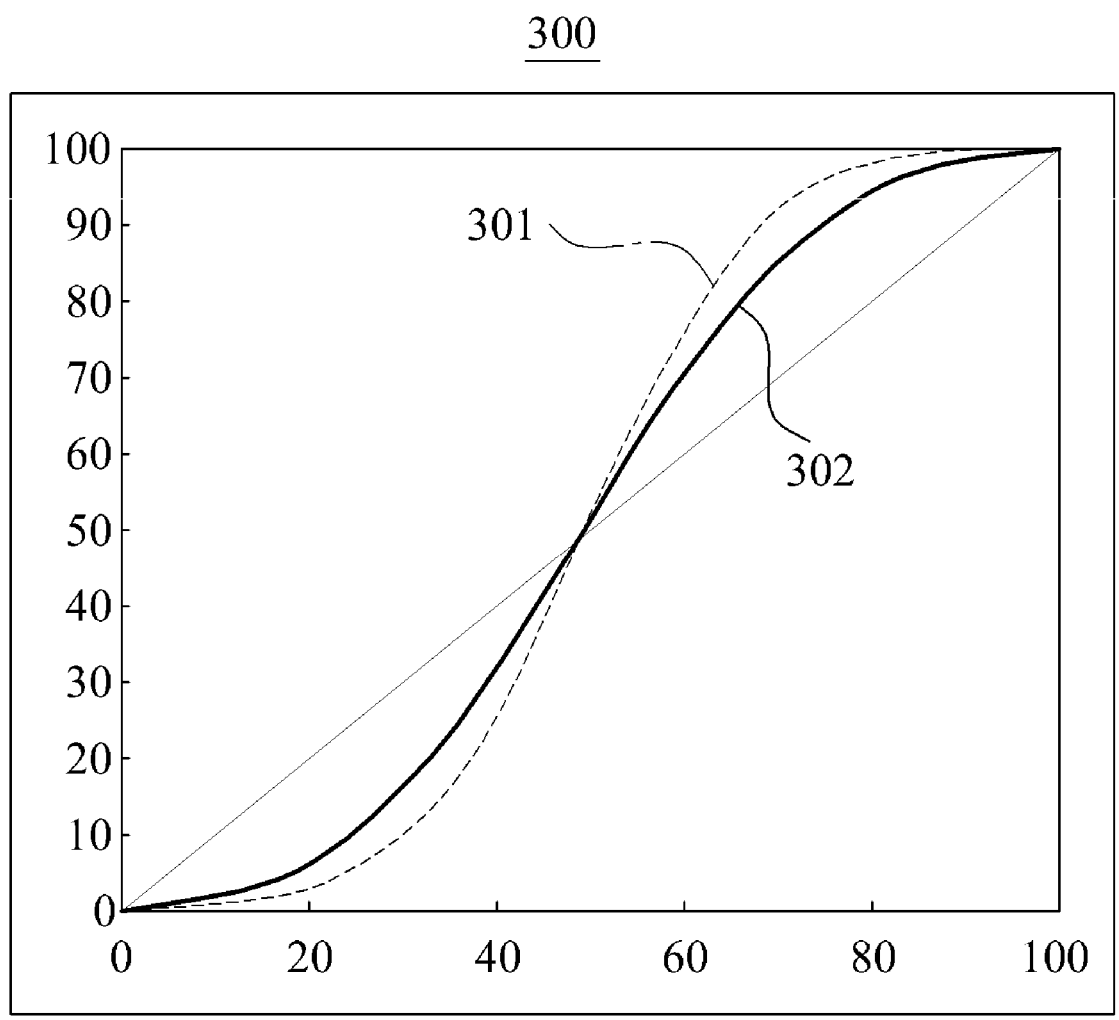
FIG. 3 illustrates an example for describing a lightness rescale of an entire input image according to an embodiment of the present invention.

FIG. 3 illustrates an example for describing a lightness rescale of an entire input image according to an embodiment of the present invention. X axis and y axis of a graph 300 respectively illustrate a lightness value before and after applying the sigmoid function. Specifically, curves 301 and 302 are results of applying the sigmoid function to an equal average using different standard deviations, and the curve 301 illustrates an example of using the standard deviation less than the standard deviation of the curve 302.

After the sigmoid function is applied to the entire input image, the texture reproduction system adjusts a lightness of each pixel using a global mapped lightness according to the classification of the pixel. Specifically, as described above, the texture reproduction system may apply different gains to the pixel classified as the soft pixel based on the average value. In this instance, the texture reproduction system may compare the average value and the lightness value of the soft pixel and respectively apply different gains to a case where the lightness value is less than the average value, and a case where the lightness value is greater than the average value.

Figure 4:
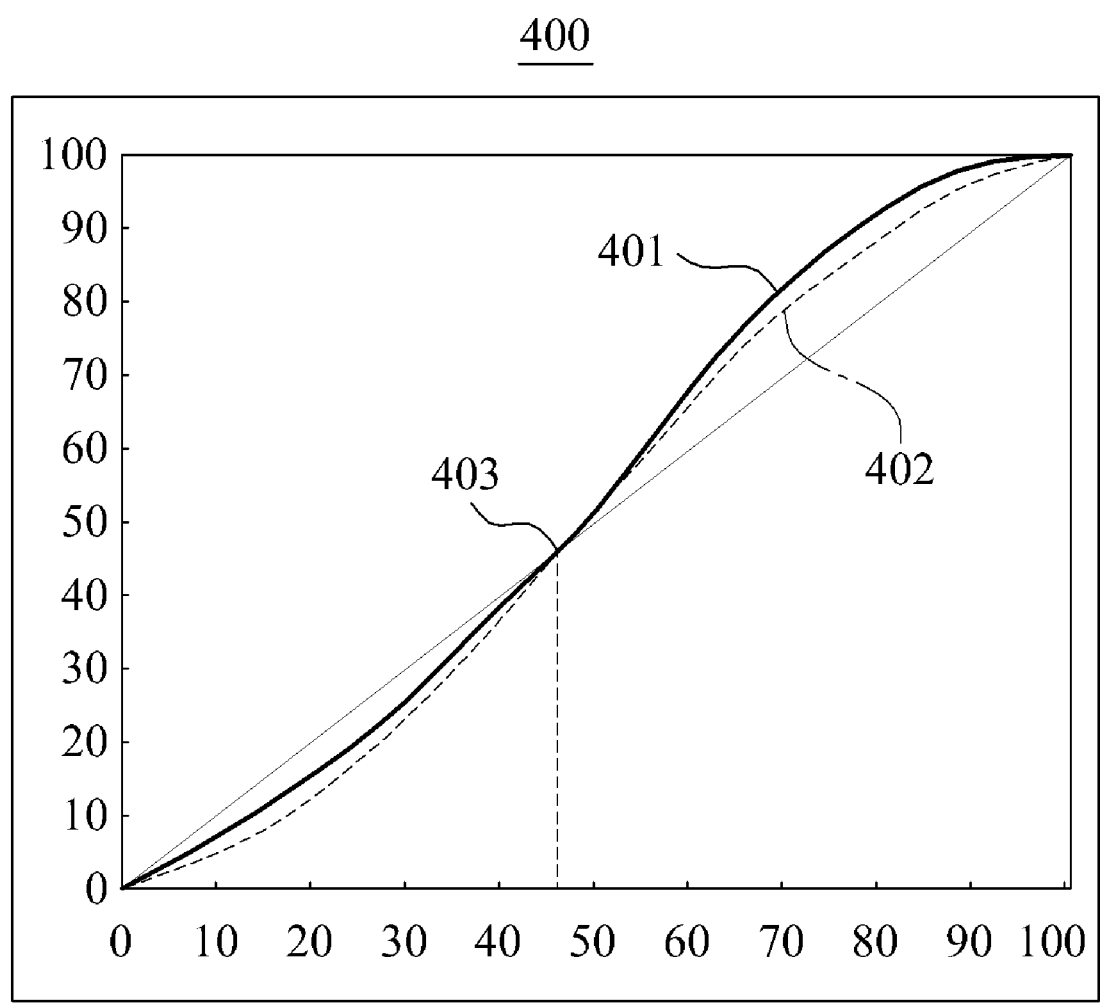
FIG. 4 illustrates an example for describing a lightness remapping for a soft pixel after applying a sigmoid function according to an embodiment of the present invention.

FIG. 4 illustrates an example for describing a lightness remapping for a soft pixel after applying a sigmoid function according to an embodiment of the present invention. Specifically, in a graph 400, a curve 401 illustrates a result of correcting a lightness of a curve 402 based on a gain. In this case, different gains may be applied to a lightness value greater than an average value 403 and a lightness value less than the average value 403. Specifically, a lightness of the soft pixel is generally enhanced more significantly than a lightness of a rough pixel, thereby enhancing a tactile sensation of a visual aspect to make the soft pixel feel soft.

The different gains may be applied to the lightness value in accordance with Equation 5:

$$\text{if } (J \leq J_{avg}) \quad J = LUT[J] + (J_{Linear} - LUT[J]) \times Gain_{down} \quad \text{[Equation 5]}$$

$$\text{else} \quad J = LUT[J] - (J_{Linear} - LUT[J]) \times Gain_{up},$$

where 'J' denotes a lightness value, '$J_{avg}$' denotes an average value, 'LUT[J]' denotes a lightness value to which a sigmoid function is applied, and '$J_{Linear}$' denotes a linear lightness value. Also, '$Gain_{down}$' and '$Gain_{up}$' respectively denote a gain when a lightness value is less than an average value, and a gain when a lightness value is greater than an average value. In this instance, '$Gain_{down}$' and '$Gain_{up}$' respectively have a value between 0 and 1.

Specifically, the lightness value of the soft pixel may be increased, compared with the lightness value of the rough pixel, and a visual texture of the soft pixel may be enhanced by eliminating a difference of a global mapped lightness based on the linear lightness value being linearly inputted and the sigmoid function. In this instance, as a gain value increases, a lightness of the soft pixel relatively increases, compared with a lightness of the rough pixel.

Figure 5A:
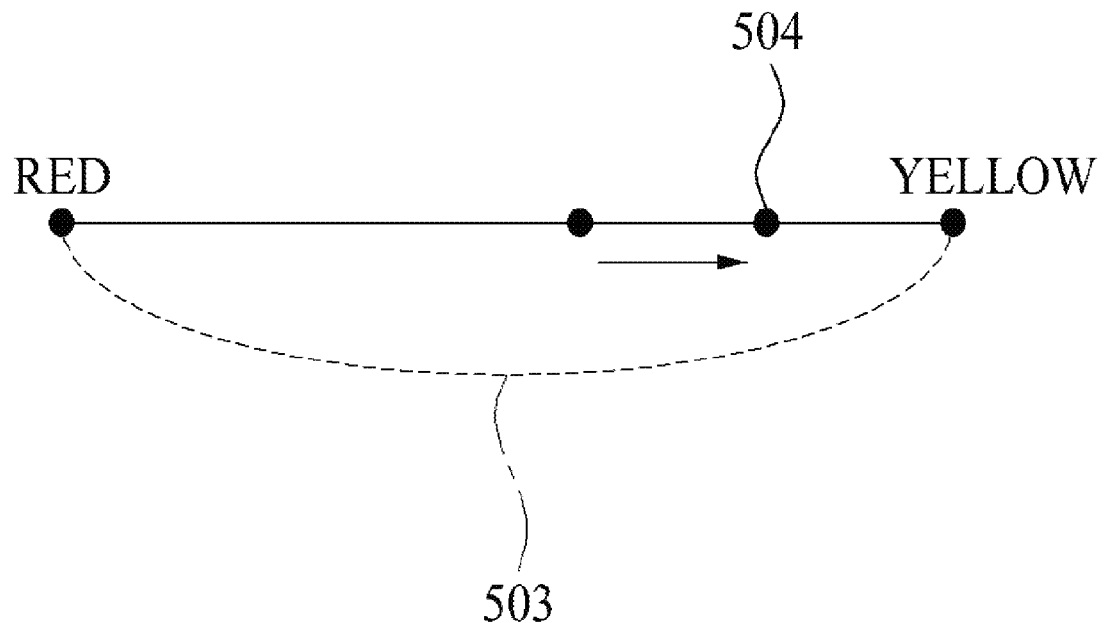
FIGS. 5A and 5B illustrate an example for describing a hue movement method according to an embodiment of the present invention.
Figure 5B:
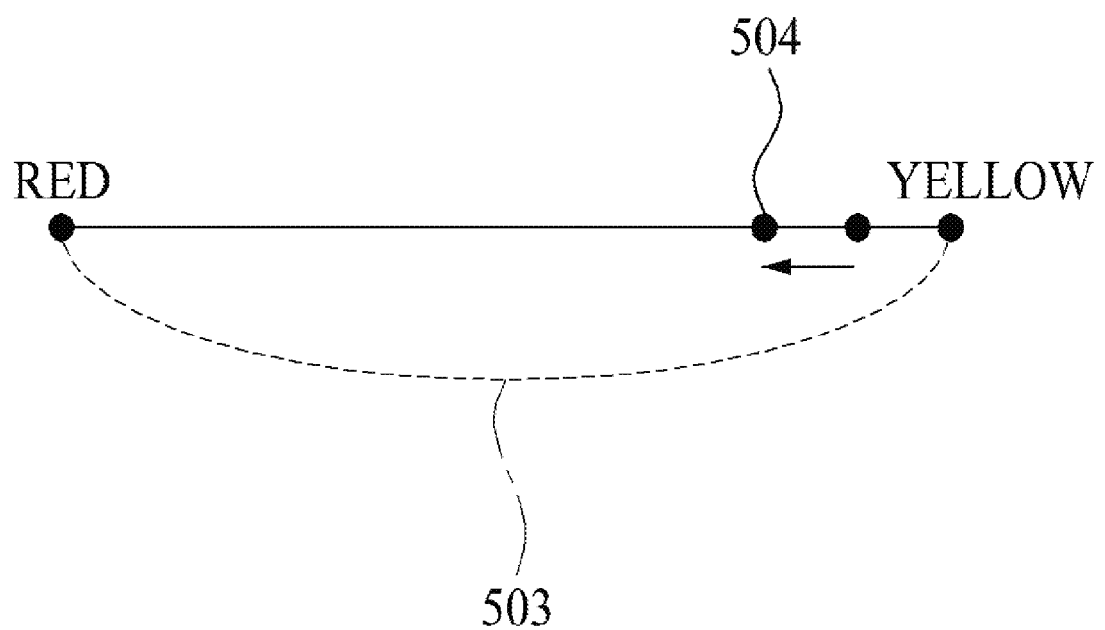

In operation S104, the texture reproduction system corrects a hue by moving a hue of the pixel according to the classification of the pixel. In this instance, the texture reproduction system moves a hue of the soft pixel based on a distance between a hue value of the soft pixel and a target point predetermined for each hue area. Specifically, the texture reproduction system determines which hue range of a disclosed hue quadrature of 'CIECAM02' includes the pixel determined as the soft pixel. The hue quadrature may be configured from 0 to 400, and include 'Red' (0 to 99), 'Yellow' (100 to 199), 'Green' (200 to 299), and 'Blue' (300 to 400). Also, the target point may be presented as a negative value of a unique hue in the hue range. FIGS. 5A and 5B illustrate an example for describing a hue movement method according to an embodiment of the present invention. Here, ranges 501 and 502 illustrate that a hue of a pixel is moved in a direction of a target point 504 in a certain range 503 of 'Red' from among hue ranges based on the distance.

For example, the texture reproduction system may verify which of the hue ranges includes the hue of the pixel, and move the hue in the direction of the target point predetermined in the corresponding hue range based on the distance in accordance with Equation 6:

$$\text{if } H_{in} < H_{target} \quad \text{[Equation 6]}$$

$$H_{out} = H_{target} - (H_{target} - H_{in})^2 \cdot \frac{s}{H_{range}} - (1-s) \cdot (H_{target} - H_{in})$$

$$\text{if } H_{in} > H_{target}$$

$$H_{out} = H_{target} + (H_{target} - H_c)^2 \cdot \frac{s}{H_{range}} + (1-s) \cdot (H_{in} - H_{target}),$$

where 's' is an abbreviation of 'Strength', is a parameter denoting a conversion degree of a hue, and has a value between 0 and 1. Also, '$H_{range}$' denotes a hue division range dividing a range of hue values ranging from 0 to 400 by four areas. '$H_{in}$' denotes a hue value of a pixel, '$H_{target}$' denotes a value of a target point, and '$H_{out}$' denotes a value of a moved value.

In operation S105, the texture reproduction system corrects a chroma based on at least one of an average chroma value of the input image and a hue value of the pixel according to a classification of the pixel. In this instance, when the pixel is the soft pixel, the texture reproduction system may control the chroma using the hue value, and when the pixel is the rough pixel, the texture reproduction system may control the chroma using the average chroma value of the entire input image and the LMD for each pixel. Specifically, as described above, after the hue of the soft pixel is moved in the direction of the target point predetermined for each hue range in operation S104, the chroma of the soft pixel may be adaptively enhanced using a distance between the target point and the hue value being a value of the moved hue. For example, as the distance between the value of the moved hue and the target point increases, an enhancement degree of the chroma decreases. Conversely, as the distance between the value of the moved hue and the target point decreases, the enhancement degree of the chroma increases. Since a loss of hue information increases as the value of the moved hue comes closer to the target point, the moving of the pixel is for restoring the hue information damaged by a movement of the hue.

Also, when the pixel is the rough pixel, the texture reproduction system finds the average chroma value of the entire input image. In this instance, the chroma value of each pixel is controlled by the average chroma value. For example, when the chroma value of the rough pixel is less than the average chroma value, the texture reproduction system reduces, by the gain, the chroma value of the rough pixel, and when the chroma value of the rough pixel is greater than or equal to the average chroma value, the texture reproduction system maintains the chroma value of the rough pixel. The reduction is for amplifying a sensitivity of the image of the rough pixel by maximizing a chroma contrast using the chroma value of the rough pixel. Specifically, the gain of the chroma is controlled using the average LMD calculated in the rough pixel. The controlling is for preventing a discontinuous chroma value based on a change of the average LMD, and following Equation 7 may be used as an example.

$$C_{controlled\_rough} = \qquad \text{[Equation 7]}$$
$$C_{in} \times Gain_{rough} = C_{in} \times \left[ \frac{(Gain_{max} - Gain_{Max\_avg})}{255 - LMD_{Threshold}} \times (LMD_{in} - LMD_{Threshold}) + Gain_{Max\_avg} \right]$$
$$Gain_{MAX\_avg} = (Gain_{max} + 1)/2,$$

where '$C_{controlled\_rough}$' denotes a corrected chroma value of a rough pixel, '$C_{in}$' denotes an inputted chroma value of a rough pixel, and '$Gain_{max}$' denotes a maximum value of a gain.

As described above, when the lightness value and the chroma value are changed, a value out of a color gamut may exist. Since this causes a reversion phenomenon of a color, the present embodiment of the present invention may apply a gamut clipping scheme after correcting the chroma.

In operation S106, the texture reproduction system converts a color space of an output image. Specifically, the texture reproduction system may convert the color space of the output image in which the lightness, the hue, and the chroma are enhanced, and convert the color space into an RGB digital signal.

In operation S107, the texture reproduction system outputs a final output value of the pixel via a high frequency component extracted using the RGB values for each pixel. In this instance, the texture reproduction system may extract the high frequency component from the RGB values using a spatial filter being a digital filter in accordance with each feature for the pixel processed using the hue information based on a texture, and output the final output value based on a gain value determined by the high frequency component and the LMD, and the RGB values. In this instance, the gain value may be controlled in accordance with Equation 8:

$$G_{control} = \frac{G_{max} - G_{min}}{255 - LMD_{Th}} \times (R_{level} - LMD_{Th}) + G_{min}, \qquad \text{[Equation 8]}$$

where '$LMD_{th}$' denotes an LMD threshold described using operation S103, and 'Rlevel' denotes an average LMD calculated in a 5*5 block.

Figure 6:
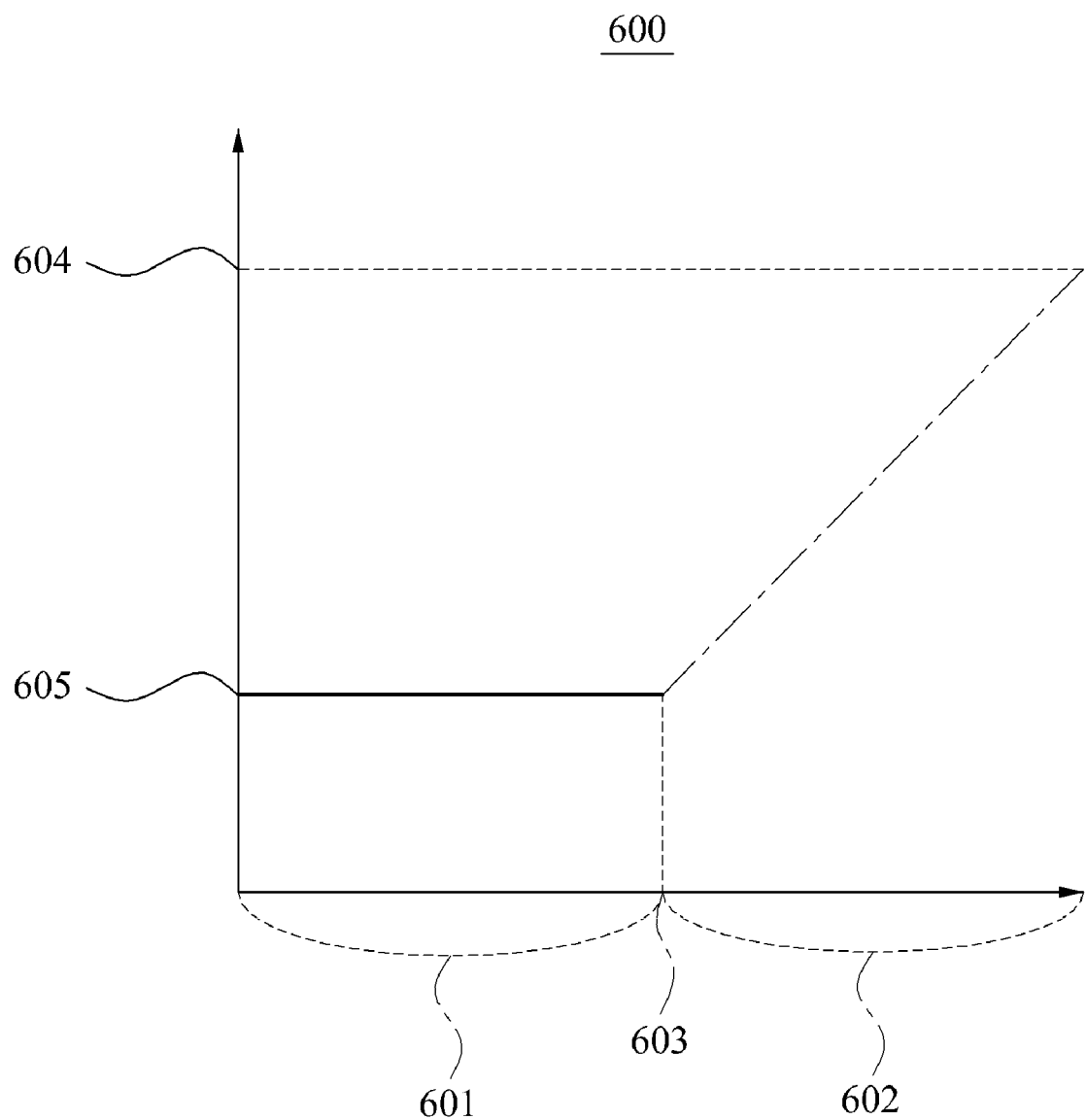
FIG. 6 illustrates an example for a gain value adjustment based on an LMD threshold in detail enhancement of a spatial filter according to an embodiment of the present invention.

In the case of a detail enhancement filter, when the LMD of the pixel is less than the LMD threshold based on the LMD threshold, the gain value maintains a minimum gain value, and when the LMD is greater than the LMD threshold, the gain value is enhanced based on the LMD, thereby adaptively enhancing the high frequency component. FIG. 6 illustrates an example for a gain value adjustment based on an LMD threshold in detail enhancement of a spatial filter according to an embodiment of the present invention. In a graph 600, x axis denotes an LMD, and y axis denotes a gain value. In this instance, an area of a soft pixel 601 and an area of a rough pixel 602 are divided based on an LMD threshold 603. Specifically, as illustrated in FIG. 6, in the area of the rough pixel 602 in which the LMD is higher than the LMD threshold 603, the gain value is adaptively enhanced to be a maximum value 604, and in the area of the soft pixel 601 in which the LMD is lower than the LMD threshold 603, the gain value maintains a minimum value 605.

The texture reproduction system subsequently may calculate and output the final output value based on the controlled gain value. For example, the final output value may be calculated and outputted in accordance with Equation 9:

$$R_{out} = R_{in} + R_{Gain} \times R_{HPF} \qquad \text{[Equation 9]}$$
$$G_{out} = G_{in} + G_{Gain} \times G_{HPF}$$
$$B_{out} = B_{in} + B_{Gain} \times B_{HPF},$$

where '$R_{in}$', '$G_{in}$', and '$B_{in}$' denote RGB values of an input image, and '$R_{out}$', '$G_{out}$', and '$B_{out}$' denote RGB values of an output image. Also, '$R_{HPF}$', '$G_{HPF}$', and '$B_{HPF}$' denote high frequency components extracted from an applied filter. Specifically, the final output value may be calculated by adding an output value of the filter in which the gain value is applied to each of the RGB values.

As described above, using operation S101 through operation S107, the texture reproduction system may maximize realism by analyzing an input image, controlling both a geometric attribute and a color attribute, which configure a tactile sensation of a visual aspect, based on a feature of a corresponding texture, and adaptively reflecting the feature based on the feature of the texture.

Figure 7:
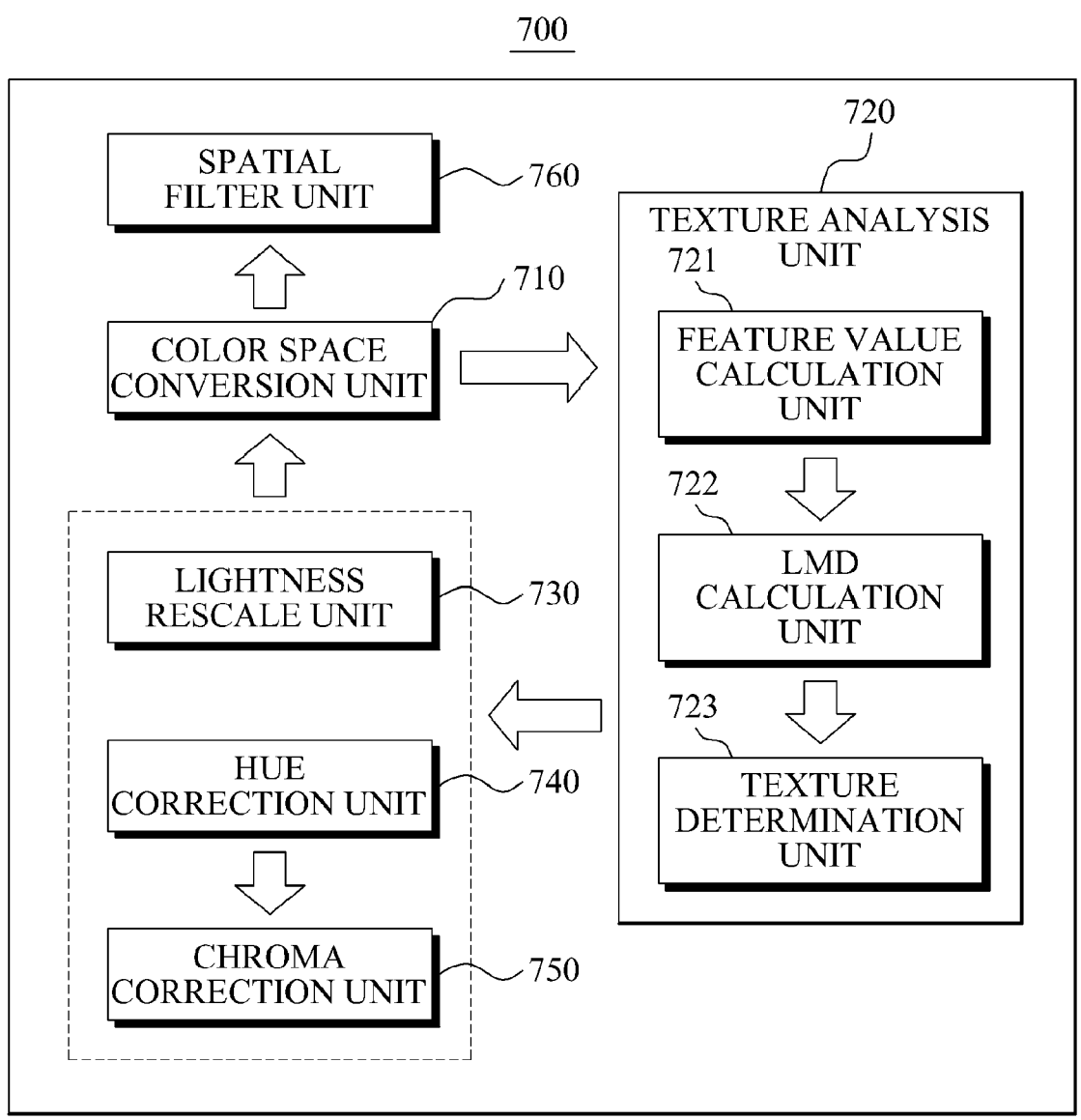
FIG. 7 is a block diagram illustrating an internal configuration of a texture reproduction system according to an embodiment of the present invention.

FIG. 7 is a block diagram illustrating an internal configuration of a texture reproduction system 700 according to an embodiment of the present invention. Here, the texture reproduction system 700 includes a color space conversion unit 710, a texture analysis unit 720, a lightness rescale unit 730, a hue correction unit 740, a chroma correction unit 750, and a spatial filter unit 760.

The color space conversion unit 710 converts a color space of at least one of the input image and an output image. In this instance, the color space conversion unit 710 may process a conversion between color spaces based on a human perceptual attribute including at least one of the color space, a lightness, a chroma, and a hue according to the RGB values.

The texture analysis unit 720 classifies a pixel included in an input image using RGB values of the pixel. The texture analysis unit 720 may calculate a predetermined feature value using the RGB values being input values for classifying a type of a texture of the pixel included in the input image.

In this instance, the texture analysis unit 720 may classify the texture of the pixel using the feature value changed from the RGB values. For this, as illustrated in FIG. 7, the texture analysis unit 720 may include a feature value calculation unit 721 to calculate a feature value of the pixel based on the RGB values, an LMD calculation unit 722 to calculate an LMD of the feature value for each a*a-sized pixel group, and a texture determination unit 723 to determine a texture of the pixel based on an average LMD of a b*b-sized pixel group and a predetermined LMD threshold. In this instance, the texture determination unit 723 compares the average LMD and the LMD threshold and classifies the pixel as either a rough pixel or a soft pixel.

The lightness rescale unit 730 rescales a lightness based on a sigmoid function and the classification of the pixel. In this instance, the lightness rescale unit 730 may apply the sigmoid function to a lightness value of an entire pixel based on lightness values and an average value of the lightness values, and apply different gains to a lightness value of the soft pixel from among pixels to which the sigmoid function is applied, based on the average value.

For this, the lightness rescale unit 730 may rescale the lightness by calculating an average value of the entire input image for the lightness value, and applying the sigmoid function to the entire input image using the average value. Here, an LUT for scaling the lightness may be calculated using a discrete cumulative normal function in accordance with the above-described Equation 4.

After the sigmoid function is applied to the entire input image, the lightness rescale unit 730 adjusts the lightness of each pixel using a global mapped lightness according to the classification of the pixel. Specifically, as described above, the lightness rescale unit 730 may apply different gains to the pixel classified as the soft pixel based on the average value. In this instance, the lightness rescale unit 730 may compare the average value and the lightness value of the soft pixel and respectively apply different gains to a case where the lightness value is less than the average value, and a case where the lightness value is greater than the average value. Also, the lightness rescale unit 730 may generally enhance the lightness of the soft pixel more significantly than the lightness of the rough pixel, thereby enhancing a tactile sensation of a visual aspect to make the soft pixel feel soft.

Specifically, the lightness value of the soft pixel may be increased, compared with the lightness value of the rough pixel, and a visual texture of the soft pixel may be enhanced by eliminating a difference of a global mapped lightness based on a linear lightness value being linearly inputted and the sigmoid function. In this instance, as a gain value increases, a lightness of the soft pixel relatively increases, compared with a lightness of the rough pixel.

The hue correction unit 740 corrects a hue by moving a hue of the pixel according to the classification of the pixel. In this instance, the hue correction unit 740 moves a hue of the soft pixel based on a distance between a hue value of the soft pixel and a target point predetermined for each hue area. Specifically, the hue correction unit 740 determines which hue range of a disclosed hue quadrature of 'CIECAM02' includes the pixel determined as the soft pixel. The hue quadrature may be configured from 0 to 400, and include 'Red' (0 to 99), 'Yellow' (100 to 199), 'Green' (200 to 299), and 'Blue' (300 to 400). Also, the target point may be presented as a negative value of a unique hue in the hue range.

The chroma correction unit 750 corrects a chroma based on at least one of an average chroma value of the input image and a hue value of the pixel according to a classification of the pixel. In this instance, when the pixel is the soft pixel, the chroma correction unit 750 may control the chroma using the hue value, and when the pixel is the rough pixel, the chroma correction unit 750 may control the chroma using the average chroma value of the entire input image and the LMD for each pixel. Specifically, as described above, after the hue of the soft pixel is moved in the direction of the target point predetermined for each hue range, the chroma of the soft pixel may be adaptively enhanced using a distance between the target point and the hue value being a value of the moved hue. For example, as the distance between the value of the moved hue and the target point increases, an enhancement degree of the chroma decreases. Conversely, as the distance between the value of the moved hue and the target point decreases, the enhancement degree of the chroma increases. Since a loss of hue information increases as the value of the moved hue approaches the target point, this is for restoring the hue information damaged by a movement of the hue.

Also, when the pixel is the rough pixel, the chroma correction unit 750 finds the average chroma value of the entire input image. In this instance, the chroma value of each pixel is controlled by the average chroma value. For example, when the chroma value of the rough pixel is less than the average chroma value, the chroma correction unit 750 reduces, by the gain, the chroma value of the rough pixel, and when the chroma value of the rough pixel is greater than or equal to the average chroma value, the chroma correction unit 750 maintains the chroma value of the rough pixel. The maintaining is for amplifying a sensitivity of the image of the rough pixel by maximizing a chroma contrast using the chroma value of the rough pixel. Specifically, the gain of the chroma may be controlled using the average LMD calculated in the rough pixel, and a discontinuous chroma value based on a change of the average LMD may be prevented.

The spatial filter unit 760 outputs a final output value of the pixel via a high frequency component extracted using the RGB values for each pixel. In this instance, the spatial filter unit 760 may extract the high frequency component from the RGB values using a spatial filter being a digital filter in accordance with each feature for the pixel processed using the hue information based on a texture, and output the final output value based on a gain value determined by the high frequency component and the LMD, and the RGB values.

In the case of a detail enhancement filter, when the LMD of the pixel is less than the LMD threshold based on the LMD threshold, the gain value maintains a minimum gain value, and when the LMD is greater than the LMD threshold, the gain value is enhanced based on the LMD, thereby adaptively enhancing the high frequency component.

As described above, the texture reproduction system 700 may maximize realism by analyzing an input image, controlling both a geometric attribute and a color attribute, which configure a tactile sensation of a visual aspect, based on a feature of a corresponding texture, and adaptively reflecting the feature based on the feature of the texture.

Figure 8:
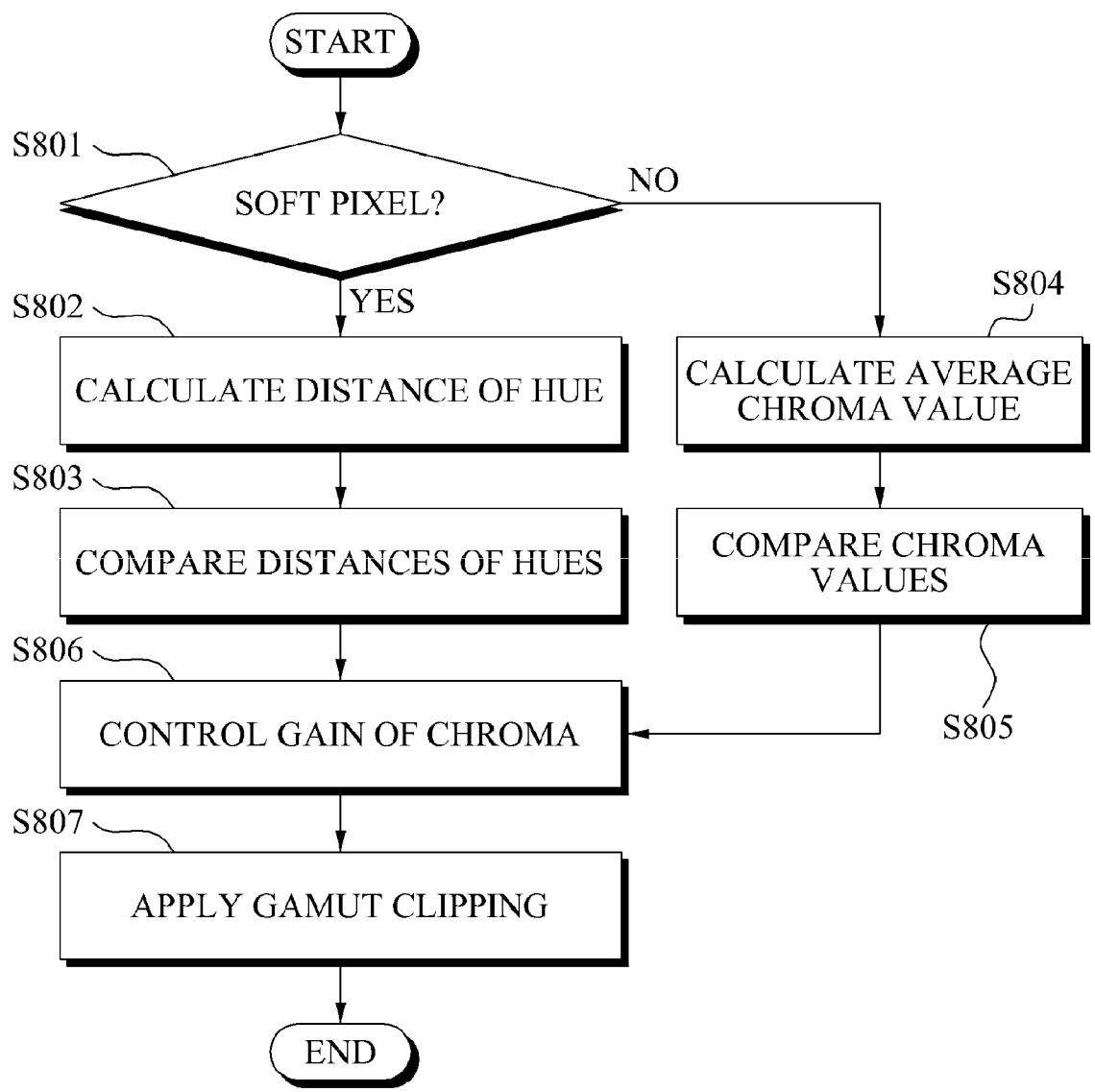
FIG. 8 is a flowchart illustrating a chroma correction method according to an embodiment of the present invention.

FIG. 8 is a flowchart illustrating a chroma correction method according to an embodiment of the present invention.

When the pixel is a soft pixel in operation S801, a chroma correction system which corrects a chroma of an inputted pixel performs operation S802, and when the pixel is not the soft pixel in operation S801, the chroma correction system performs operation S806 after performing operations S804 and S805. Specifically, the pixel may be classified as either a soft pixel or a rough pixel based on an LMD of RGB values of the input image, and the chroma correction system may correct the chroma of the pixel using different methods according to a classification of the pixel.

In operation S802, the chroma correction system calculates a distance of a hue. In this instance, the distance may be determined based on a distance between the hue and a predetermined target point of a hue range corresponding to the hue.

In operation S803, the chroma correction system compares distances of the hues. In this instance, the chroma correction system may compare a distance between the hue of the soft pixel and the target point.

In operation S804, the chroma correction system calculates an average chroma value. Specifically, when the pixel is determined as the rough pixel in operation S801, the chroma correction system first calculates the average chroma value of the entire input image.

In operation S805, the chroma correction system compares chroma values of each pixel. In this instance, the chroma correction system may compare the chroma values and the average chroma value.

In operation S806, the chroma correction system controls a gain of the chroma. The chroma correction system may correct the chroma of the corresponding pixel based on a distance comparison result and a chroma value comparison result. For example, when the pixel is the soft pixel, the chroma may be enhanced as the distance between the hue and the target point decreases. Specifically, the chroma correction system enhances the chroma of the soft pixel in proportion to the distance between the hue of the pixel and the predetermined target point. Since a loss of hue information increases as the value of the hue comes closer to the target point, the enhancing is for restoring the hue information by enhancing the chroma.

Also, when the pixel is the rough pixel, the chroma correction system may correct the chroma based on a comparison result between the chroma values and the average chroma value. Specifically, when the chroma value of the rough pixel is less than the average chroma value, the chroma correction system may reduce, by the gain, the chroma value of the rough pixel, and when the chroma value of the rough pixel is greater than or equal to the average chroma value, the chroma correction system may maintain the chroma value of the rough pixel. This is for amplifying a sensitivity of the image of the rough pixel by maximizing a chroma contrast using the chroma value of the rough pixel.

In operation S807, the chroma correction system applies a gamut clipping in order to prevent a reversion phenomenon of a color from being generated since a value outside a color gamut exists using a correction of the chroma.

Figure 9:
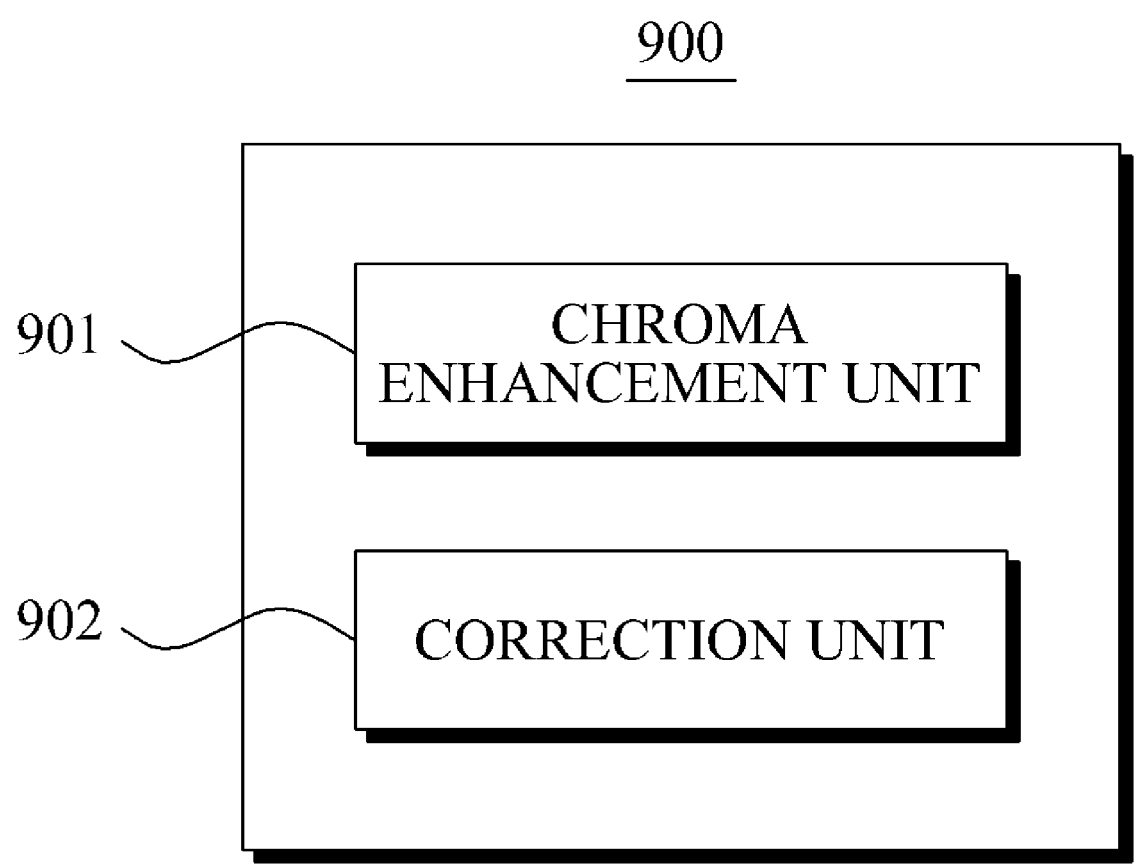
FIG. 9 is a block diagram illustrating an internal configuration of a chroma correction system according to an embodiment of the present invention.

FIG. 9 is a block diagram illustrating an internal configuration of a chroma correction system according to an embodiment of the present invention. As illustrated in FIG. 9, the chroma correction system 900 includes a chroma enhancement unit 901 and a correction unit 902.

The chroma enhancement unit 901 enhances a chroma of a soft pixel based on a hue of a pixel and a predetermined target point according to a classification of the pixel. In this instance, the pixel is classified as either a soft pixel or a rough pixel based on an LMD of RGB values of the input image, and the chroma enhancement unit 901 enhances the chroma of the soft pixel in proportion to a distance between the hue of the pixel and the predetermined target point. In this case, the target point is a negative value of a unique hue and is predetermined for each hue range, and when a corresponding pixel is the soft pixel, the hue includes a hue moved in a direction of a target point of a corresponding hue range.

The correction unit 902 corrects a chroma value based on the chroma value, an average chroma value of an input image, and a gain according to the classification of the pixel. For this, when the chroma value of the rough pixel is less than the average chroma value, the correction unit 902 reduces, by the gain, the chroma value of the rough pixel, and when the chroma value of the rough pixel is greater than or equal to the average chroma value, the correction unit 902 maintains the chroma value of the rough pixel. The gain is controlled based on an average LMD calculated in the rough pixel and a predetermined LMD threshold.

The above-described exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A texture reproduction system comprising:
   a texture analysis unit to classify a pixel included in an input image as either a rough pixel or a soft pixel using Red Green Blue (RGB) values of the pixel according to a predetermined threshold value;
   a chroma correction unit to correct a chroma based on at least one of an average chroma value of the input image and a hue value of the pixel according to a classification of the pixel; and
   a spatial filter unit to output a final output value of the pixel via a high frequency component extracted using the RGB values for each pixel.

2. The system of claim 1, wherein the texture analysis unit comprises:
   a feature value calculation unit to calculate a feature value of the pixel based on the RGB values;

a Local Maximum Difference (LMD) calculation unit to calculate an LMD of the feature value for each a*a-sized pixel group; and a texture determination unit to determine a texture of the pixel based on an average LMD of a b*b-sized pixel group and a predetermined LMD threshold.

3. The system of claim 2, wherein the texture determination unit compares the average LMD and the LMD threshold and classifies the pixel as either a rough pixel or a soft pixel.

4. The system of claim 1, wherein the pixel is classified as either a rough pixel or a soft pixel, and the chroma correction unit comprises:

a chroma enhancement unit to enhance a chroma of the soft pixel based on a hue of the soft pixel and a predetermined target point; and a correction unit to correct a chroma value of the rough pixel based on the chroma value of the rough pixel, the average chroma value of the input image, and a gain.

5. The system of claim 4, wherein the hue of the soft pixel is moved in a direction of the target point predetermined for each hue range, and the chroma enhancement unit enhances the chroma of the soft pixel in proportion to a distance between the hue moved in the hue range and the target point.

6. The system of claim 4, wherein, when the chroma value of the rough pixel is less than the average chroma value, the correction unit reduces, by the gain, the chroma value of the rough pixel, and when the chroma value of the rough pixel is greater than or equal to the average chroma value, the correction unit maintains the chroma value of the rough pixel.

7. The system of claim 1, further comprising:

a lightness rescale unit to rescale a lightness based on a sigmoid function and the classification of the pixel.

8. The system of claim 7, wherein the pixel is classified as either a rough pixel or a soft pixel, and the lightness rescale unit comprises:

a global lightness mapping unit to apply the sigmoid function to a lightness value of an entire pixel based on lightness values and an average value of the lightness values; and a lightness remapping unit to apply different gains to a lightness value of the soft pixel from among pixels to which the sigmoid function is applied, based on the average value.

9. The system of claim 1, further comprising:

a hue correction unit to correct a hue by moving a hue of the pixel according to the classification of the pixel.

10. The system of claim 9, wherein the pixel is classified as either a rough pixel or a soft pixel, and the hue correction unit moves a hue of the soft pixel based on a distance between a hue value of the soft pixel and a target point predetermined for each hue area.

11. The system of claim 1, further comprising:

a color space conversion unit to convert a color space of at least one of the input image and an output image, and a conversion between color spaces is processed based on a human perceptual attribute including at least one of the color space, a lightness, a chroma, and a hue according to the RGB values.

12. A chroma correction system comprising:

a texture analysis unit to classify a pixel included in an input image as either a rough pixel or a soft pixel using Red Green Blue (RGB) values of the pixel according to a predetermined threshold value;

a chroma enhancement unit to enhance a chroma of a soft pixel based on a hue of a pixel and a predetermined target point according to a classification of the pixel; and a correction unit to correct a chroma value based on the chroma value, an average chroma value of an input image, and a gain according to the classification of the pixel.

13. The system of claim 12, wherein the pixel is classified as either a soft pixel or a rough pixel based on an LMD of RGB values of the input image, and the chroma enhancement unit enhances the chroma of the soft pixel in proportion to a distance between the hue of the pixel and the predetermined target point.

14. The system of claim 13, wherein the target point is a negative value of a unique hue and is predetermined for each hue range, and when a corresponding pixel is the soft pixel, the hue includes a hue moved in a direction of a target point of a corresponding hue range.

15. The system of claim 12, wherein, when a chroma value of a rough pixel is less than the average chroma value, the correction unit reduces, by the gain, the chroma value of the rough pixel, and when the chroma value of the rough pixel is greater than or equal to the average chroma value, the correction unit maintains the chroma value of the rough pixel.

16. The system of claim 15, wherein the gain is controlled based on an average LMD calculated in the rough pixel and a predetermined LMD threshold.

17. A texture reproduction method comprising:

classifying a pixel included in an input image as either a rough pixel or a soft pixel using RGB values of the pixel by a processor according to a predetermined threshold value;

correcting a chroma based on at least one of an average chroma value of the input image and a hue value of the pixel according to a classification of the pixel; and outputting a final output value of the pixel via a high frequency component extracted using the RGB values for each pixel.

18. The method of claim 17, wherein the classifying comprises:

calculating a feature value of the pixel based on the RGB values;

calculating an LMD of the feature value for each a*a-sized pixel group; and determining a texture of the pixel based on an average LMD of a b*b-sized pixel group and a predetermined LMD threshold.

19. The method of claim 17, wherein the pixel is classified as either a rough pixel or a soft pixel, and the correcting comprises:

enhancing a chroma of the soft pixel based on a hue of the soft pixel and a predetermined target point; and correcting a chroma value of the rough pixel based on the chroma value of the rough pixel, the average chroma value of the input image, and a gain.

20. The method of claim 19, wherein the hue of the soft pixel is moved in a direction of the target point predetermined for each hue range, and the enhancing comprises enhancing the chroma of the soft pixel in. proportion to a distance between the hue moved in the hue range and the target point.

21. The method of claim 19, wherein, when the chroma value of the rough pixel is less than the average chroma value, the correcting comprises reducing, by the gain, the chroma value of the rough pixel, and when the chroma value of the rough pixel is greater than or equal to the average chroma value, the correcting comprises maintaining the chroma value of the rough pixel.

22. A non-transitory computer-readable recording medium storing a program for implementing a texture reproduction method comprising:
- classifying a pixel included in an input image as either a rough pixel or a soft pixel using RGB values of the pixel according to a predetermined threshold value;
- correcting a chroma based on at least one of an average chroma value of the input image and a hue value of the pixel according to a classification of the pixel; and
- outputting a final output value of the pixel via a high frequency component extracted using the RGB values for each pixel.

23. A chroma correction method comprising:
- classifying a pixel included in an input image as either a rough pixel or a soft pixel using Red Green Blue (RGB) values of the pixel according to a predetermined threshold value;
- enhancing a chroma of a soft pixel based on a hue of a pixel and a predetermined target point according to a classification of the pixel by a processor; and
- correcting a chroma value based on the chroma value, an average chroma value of an input image, and a gain according to the classification of the pixel.

24. The method of claim 23, wherein the pixel is classified as either a soft pixel or a rough pixel based on an LMD of RGB values of the input image, and
- the enhancing comprises enhancing the chroma of the soft pixel in proportion to a distance between the hue of the pixel and the predetermined target point.

25. The method of claim 23, wherein, when a chroma value of a rough pixel is less than the average chroma value, the correcting comprises reducing, by the gain, the chroma value of the rough pixel, and when the chroma value of the rough pixel is greater than or equal to the average chroma value, the correcting comprises maintaining the chroma value of the rough pixel.

* * * * *